United States Patent
Wang

(10) Patent No.: US 7,510,645 B2
(45) Date of Patent: Mar. 31, 2009

(54) HYDROCRACKING CATALYST CONTAINING BETA AND Y ZEOLITES, AND PROCESS FOR ITS USE TO PRODUCE NAPHTHA

(75) Inventor: Li Wang, Bloomingdale, IL (US)

(73) Assignee: UOP LLC, Des Plaines, IL (US)

( * ) Notice: Subject to any disclaimer, the term of this patent is extended or adjusted under 35 U.S.C. 154(b) by 578 days.

(21) Appl. No.: 11/267,244

(22) Filed: Nov. 4, 2005

(65) Prior Publication Data

US 2007/0102321 A1    May 10, 2007

(51) Int. Cl.
- C10G 11/00 (2006.01)
- B01J 29/08 (2006.01)
- B01J 21/00 (2006.01)
- B01J 29/06 (2006.01)
- B01J 38/58 (2006.01)

(52) U.S. Cl. .............. 208/120.1; 208/46; 208/108; 208/111; 208/111.15; 502/30; 502/63; 502/64; 502/66; 502/67; 502/75; 502/79

(58) Field of Classification Search ............... 208/46, 208/108, 111, 111.15, 120.1; 502/30, 63, 502/64, 66, 67, 75, 79
See application file for complete search history.

(56) References Cited

U.S. PATENT DOCUMENTS

| | | | |
|---|---|---|---|
| 4,486,296 A | 12/1984 | Oleck et al. | 208/111 |
| 4,661,239 A | 4/1987 | Steigleder | 208/111 |
| 4,925,546 A | 5/1990 | Kukes et al. | 208/111 |
| 5,160,033 A | 11/1992 | Vassilakis et al. | 208/111 |
| 5,275,720 A | 1/1994 | Ward | 208/111 |
| 5,279,726 A | 1/1994 | Ward | 208/111 |
| 5,350,501 A | 9/1994 | Ward | 208/111 |
| 5,358,917 A | 10/1994 | Van Veen et al. | 502/66 |
| 5,447,623 A * | 9/1995 | Ward | 208/111.15 |
| 5,853,566 A | 12/1998 | Kraushaar-Czarnetzki et al. | 208/109 |
| 6,670,295 B2 | 12/2003 | Wang et al. | 502/66 |
| 2004/0045871 A1 | 3/2004 | Bauer | 208/111.01 |
| 2004/0152587 A1 | 8/2004 | Creyghton et al. | 502/64 |
| 2005/0197249 A1 | 9/2005 | Creyghton et al. | 502/439 |
| 2006/0073963 A1 | 4/2006 | Creyghton et al. | 502/64 |
| 2006/0175231 A1 | 8/2006 | Hansen et al. | 208/120.01 |

FOREIGN PATENT DOCUMENTS

| | | |
|---|---|---|
| EP | 528494 A1 | 2/1993 |
| EP | 967014 A1 | 12/1999 |
| WO | WO 2005/001000 A1 | 1/2005 |
| WO | WO 2006/032698 A1 | 3/2006 |

OTHER PUBLICATIONS

Ward, J.W. Hydrocracking Processes and Catalysts *Fuel Processing Technology*, 35 (1993) Elsevier Science Publishers B. V., Amsterdam pp. 55-85.

Bezman, R. "Relationship between Zeolite Framework Composition and Hydrocracking Catalyst Performance" *Catalysis Today*, 13 (1992) Elsevier Science Publishers B.V., Amsterdam pp. 143-156.

* cited by examiner

*Primary Examiner*—Glenn Caldarola
*Assistant Examiner*—Prem C. Singh
(74) *Attorney, Agent, or Firm*—Michael A. Moore; Kurt D Van Tassel

(57) ABSTRACT

Increased yields of naphtha and increased catalyst activity are obtained in a hydrocracking process by the use of a catalyst containing a beta zeolite and a Y zeolite having a unit cell size from 24.38 to 24.50 angstrom. The catalyst has a relatively high amount of Y zeolite relative to beta zeolite.

19 Claims, No Drawings

HYDROCRACKING CATALYST CONTAINING BETA AND Y ZEOLITES, AND PROCESS FOR ITS USE TO PRODUCE NAPHTHA

FIELD OF THE INVENTION

The invention relates to catalyst compositions and their use in hydrocarbon conversion processes, particularly hydrocracking. The invention more specifically relates to a catalyst composition that comprises a Y zeolite and a beta zeolite as active cracking components. The invention specifically relates to a hydrocracking process that produces naphtha.

BACKGROUND OF THE INVENTION

Petroleum refiners often produce desirable products such as naphtha and gasoline as well as higher boiling liquids, such as turbine fuel, diesel fuel, and other hydrocarbon liquids known as middle distillates, by hydrocracking a hydrocarbon feedstock derived from crude oil. Hydrocracking also has other beneficial results such as removing sulfur and nitrogen from the feedstock by hydrotreating. Feedstocks most often subject to hydrocracking are gas oils and heavy gas oils recovered from crude oil by distillation.

Hydrocracking is generally carried out by contacting, in an appropriate reactor vessel, the gas oil or other hydrocarbon feedstock with a suitable hydrocracking catalyst under appropriate conditions, including an elevated temperature and an elevated pressure and the presence of hydrogen so as to yield a lower overall average boiling point product containing a distribution of hydrocarbon products desired by the refiner. Although the operating conditions within a hydrocracking reactor have some influence on the yield of the products, the hydrocracking catalyst is a prime factor in determining such yields.

Hydrocracking catalysts are subject to initial classification on the basis of the nature of the predominant cracking component of the catalyst. This classification divides hydrocracking catalysts into those based upon an amorphous cracking component such as silica-alumina and those based upon a zeolitic cracking component such as beta or Y zeolite. Hydrocracking catalysts are also subject to classification on the basis of their intended predominant product of which the two main products are distillate and naphtha, a term which in the hydrocracking refining art refers to distillable petroleum derived fractions having a boiling point range that is below that of distillate. Naphtha typically boils in the range of from the boiling point of hydrocarbons having six carbon atoms per molecule (i.e., $C_6$) to 216° C. (420° F.) and includes the product recovered at a refinery as gasoline. At the present time, naphtha and gasoline are in high demand. For this reason, refiners have been focusing on hydrocracking catalysts that selectively produce a naphtha fraction.

The three main catalytic properties by which the performance of a hydrocracking catalyst for producing naphtha is evaluated are activity, selectivity, and stability. Activity may be determined by comparing the temperature at which various catalysts must be utilized under otherwise constant hydrocracking conditions with the same feedstock so as to produce a given percentage, normally about 65 percent, of products boiling below 216° C. (420° F.). The lower the temperature required for a given catalyst, the more active such a catalyst is in relation to a catalyst requiring a higher temperature. Selectivity of hydrocracking catalysts for producing naphtha may be determined during the foregoing described activity test and is measured as a percentage of the fraction of the product boiling in the desired naphtha product range, e.g., $C_6$ to 216° C. (420° F.). Stability is a measure of how well a catalyst maintains its activity over an extended time period when treating a given hydrocarbon feedstock under the conditions of the activity test. Stability is generally measured in terms of the change in temperature required per day to maintain a 65 percent or other given conversion.

Although cracking catalysts for producing naphtha are known and used in commercial environments, there is always a demand for new hydrocracking catalysts with superior overall activity, selectivity, and stability for producing naphtha.

BRIEF SUMMARY OF THE INVENTION

It has been found that hydrocracking catalysts containing a beta zeolite having an overall silica to alumina ($SiO_2$ to $Al_2O_3$) mole ratio of less than 30 and a $SF_6$ adsorption capacity of at least 28 weight-percent (hereinafter wt-%) and also containing a Y zeolite having a unit cell size or dimension $a_o$, from 24.38 to 24.50 angstrom, wherein the catalyst has a weight ratio of Y zeolite to beta zeolite of from 5 to 12 on a dried basis, have substantially improved activity and selectivity compared to other hydrocracking catalysts now commercially available for use in hydrocracking processes for producing naphtha. The catalyst also contains a metal hydrogenation component such as nickel, cobalt, tungsten, molybdenum, or any combination thereof.

It is believed that a hydrocracking catalyst containing such a Y zeolite and such a beta zeolite is novel to the art.

Under typical hydrocracking conditions, including elevated temperature and pressure and the presence of hydrogen, such catalysts are highly effective for converting gas oil and other hydrocarbon feedstocks to a product of lower average boiling point and lower average molecular weight. The product contains a relatively large proportion of components boiling in the naphtha range, which as defined herein is from $C_6$ to 216° C. (420° F.).

INFORMATION DISCLOSURE

Beta and Y zeolites have been proposed in combination as components of several different catalysts including catalysts for hydrocracking. For instance, U.S. Pat. No. 5,275,720 describes a hydrocracking process using a catalyst comprising a beta zeolite and a dealuminated Y zeolite having an overall silica to alumina mole ratio greater than 6.0 and a unit cell size between about 24.40 and 24.65 angstrom. The weight ratio of the dealuminated Y zeolites to the beta zeolite may be in the range of 0.25 to 4. Preferred Y zeolites include LZ-210 zeolite.

U.S. Pat. No. 5,279,726 describes a hydrocracking process using a catalyst comprising a beta zeolite and a Y zeolite having a unit cell size greater than 24.40 angstrom, and usually a water vapor sorptive capacity at 25° C. (77° F.) and a $p/p_o$ value of 0.10 of greater than 15 weight percent. The overall silica to alumina mole ratio of the modified Y zeolites generally ranges between 5.1 and 6.0, although the modified Y zeolites may have a silica-to-alumina mole ratio above 6.0, e.g., between 6 and 20. Preferred Y zeolites include LZY-84 or Y-84 zeolite. The weight ratio of the Y zeolites to the beta zeolite may be in the range of 0.33 to 3.

U.S. Pat. No. 5,350,501 describes a hydrocracking process using a catalyst comprising a support comprising a beta zeolite and a Y zeolite having either (1) a unit cell size less than about 24.45 angstrom or (2) a sorptive capacity for water at 25° C. (77° F.) and a $p/p_o$ value of 0.10 of less than 10.00 weight percent. LZ-10 is a preferred Y zeolite. The weight ratio of the Y zeolites to the beta zeolite may be in the range of 0.33 to 3.

DETAILED DESCRIPTION OF THE INVENTION

The process and composition disclosed herein may be used to convert a feedstock containing organic compounds into products, particularly by acid catalysis, such as hydrocracking organic compounds especially hydrocarbons into a product of lower average boiling point and lower average molecular weight. The composition, which may be a catalyst and/or a catalyst support, comprises a beta zeolite and a Y zeolite. The composition may also comprise a refractory inorganic oxide. When used as a catalyst for hydrocracking, the composition contains a beta zeolite, a Y zeolite, a refractory inorganic oxide, and a hydrogenation component.

The hydrocracking process and composition disclosed herein centers on using a catalyst containing a particular beta zeolite and a particular Y zeolite at a relatively high weight ratio of Y zeolite to beta zeolite. The beta zeolite in some embodiments has a relatively low silica to alumina mole ratio and a relatively high $SF_6$ adsorption capacity. The Y zeolite has a relatively low silica to alumina mole ratio and a relatively high unit cell size. It has been found that differing performance results when such a beta zeolite and such a Y zeolite are incorporated in a hydrocracking catalysts in this way. Not only is the activity of the hydrocracking catalyst higher than that of catalysts containing the Y zeolite, but the yield of product boiling in the naphtha range is higher too. The low amount of beta zeolite relative to Y zeolite improves the yield of naphtha. Furthermore, the stability of the hydrocracking catalyst is higher than that of catalysts having a lower weight ratio of Y zeolite to beta zeolite. The low amount of beta zeolite relative to Y zeolite helps to decrease the formation of undesirable heavy polynuclear aromatic byproducts that may decrease stability.

Beta zeolite is well known in the art as a component of hydrocracking catalysts. Beta zeolite is described in U.S. Pat. No. 3,308,069 and Re No. 28,341, which are hereby incorporated by reference herein in their entireties. The beta zeolite that is used in the process and composition disclosed herein has a silica to alumina mole ratio of less than 30 in one embodiment, less than 25 in another embodiment, more than 9 and less than 30 in yet another embodiment, more than 9 and less than 25 in a further embodiment, more than 20 and less than 30 in another embodiment, or more than 15 and less than 25 in still another embodiment. As used herein, unless otherwise indicated, the silica to alumina ($SiO_2$ to $Al_2O_3$) mole ratio of a zeolite is the mole ratio as determined on the basis of the total or overall amount of aluminum and silicon (framework and non-framework) present in the zeolite, and is sometimes referred to herein as the overall silica to alumina ($SiO_2$ to $Al_2O_3$) mole ratio.

Beta zeolite is usually synthesized from a reaction mixture containing a templating agent. The use of templating agents for synthesizing beta zeolite is well known in the art. For example, U.S. Pat. No. 3,308,069 and Re No. 28,341 describe using tetraethylammonium hydroxide and U.S. Pat. No. 5,139,759, which is hereby incorporated herein by reference in its entirety, describes using the tetraethylammonium ion derived from the corresponding tetraethylammonium halide. Another standard method of preparing beta zeolite is described in the book titled Verified Synthesis of Zeolitic Materials, by H. Robson (editor) and K. P. Lillerud (XRD Patterns), second revised edition, ISBN 0-444-50703-5, Elsevier, 2001. It is believed that the choice of a particular templating agent is not critical to the success of the process disclosed herein. In one embodiment the beta zeolite is calcined in air at a temperature of from 500 to 700° C. (932 to 1292° F.) for a time sufficient to remove to remove the templating agent from the beta zeolite. Calcination to remove the templating agent can be done before or after the beta zeolite is combined with the support and/or the hydrogenation component. Although it is believed that the templating agent could be removed at calcination temperatures above 700° C. (1292° F.), very high calcination temperatures could significantly decrease the $SF_6$ adsorption capacity of beta zeolite. For this reason it is believed that calcination temperatures above 750° C. (1382° F.) for removing the templating agent should be avoided when preparing the beta zeolite for use in the process disclosed herein. It is critical to the process disclosed herein that the $SF_6$ adsorption capacity of the beta zeolite is at least 28 wt-%.

While it is known that steaming a zeolite such as beta results in changes to the actual crystalline structure of the zeolite, the abilities of present day analytical technology have not made it possible to accurately monitor and/or characterize these changes in terms of important structural details of the zeolite. Instead, measurements of various physical properties of the zeolite such as surface area are used as indicators of changes that have occurred and the extent of the changes. For instance, it is believed that a reduction in the zeolite's capacity to adsorb sulfur hexafluoride ($SF_6$) after being steamed is caused by a reduction in the crystallinity of the zeolite or in the size or accessibility of the zeolite's micropores. It is, however, an indirect correlation of the changes in the zeolite that may be undesirable, since the $SF_6$ adsorption capacity in the catalyst used in the process and composition disclosed herein is relatively high. In embodiments of the process and composition disclosed herein, the $SF_6$ adsorption capacity of the beta zeolite, whether steam treated or not, should be at least 28 wt-%.

Accordingly, the beta zeolite of the process and composition disclosed herein may be characterized in terms of $SF_6$ adsorption. This is a recognized technique for the characterization of microporous materials such as zeolites. It is similar to other adsorption capacity measurements, such as water capacity, in that it uses weight differences to measure the amount of $SF_6$ which is adsorbed by a sample which has been pretreated to be substantially free of the adsorbate. $SF_6$ is used in this test since because its size and shape hinders its entrance into pores having a diameter of less than about 6 angstrom. It thus can be used as one measurement of available pore mouth and pore diameter shrinkage. This in turn is a measurement of the effect of steaming on the zeolite. In a simplistic description of this measurement method, the sample is preferably first predried in a vacuum at 300° C. (572° F.) for one hour, then heated at atmospheric pressure in air at 650° C. (1202° F.) for two hours, and finally weighed. It is then exposed to the $SF_6$ for one hour while the sample is maintained at a temperature of 20° C. (68° F.). The vapor pressure of the $SF_6$ is maintained at that provided by liquid $SF_6$ at 400 torr (53.3 kPa (7.7 psi)). The sample is again weighed to measure the amount of adsorbed $SF_6$. The sample may be suspended on a scale during these steps to facilitate these steps.

In any mass production procedure involving techniques such as steaming and heating there is a possibility for individual particles to be subjected to differing levels of treatment. For instance, particles on the bottom of a pile moving along a belt may not be subjected to the same atmosphere or temperature as the particles which cover the top of the pile. This factor must be considered during manufacturing and also during analysis and testing of the finished product. It is, therefore, recommended that any test measure done on the catalyst is performed on a representative composite sample of the entire quantity of finished product to avoid being misled by measurements performed on individual particles or on a non-representative sample. For instance, an adsorption capacity measurement is made on a representative composite sample.

Although the process and the composition disclosed herein can use a beta zeolite that has not been subjected to a steaming treatment, the process and the composition disclosed herein can also use beta zeolite that is subjected to steaming, provided that the steaming is relatively mild in comparison to steaming of beta zeolite in the literature. Under the proper conditions and for the proper time, steaming beta zeolite can yield a catalyst that can be used in the process and composition disclosed herein.

Hydrothermally treating zeolites for use in hydrocracking catalysts is a relatively blunt tool. For any given zeolite, steaming decreases the acidity of the zeolite. When the steamed zeolite is used as a hydrocracking catalyst, the apparent result is that the overall naphtha yield increases but the catalyst's activity decreases. This apparent tradeoff between yield and activity has meant that to achieve high activity means not to steam the beta zeolite, but at the expense of lower product yields. This apparent tradeoff between naphtha yield and activity must be considered and is a limit to the improvement that appears to be obtainable by steaming the beta zeolite. When the steamed beta zeolite is used in the catalysts disclosed herein, the improvement in activity over catalysts containing only Y zeolite would appear limited while the improvement in naphtha yield over such catalysts would appear more enhanced.

If the beta zeolite is to be steamed, such steaming can be performed successfully in different ways, with the method which is actually employed commercially often being greatly influenced and perhaps dictated by the type and capability of the available equipment. Steaming can be performed with the beta zeolite retained as a fixed mass or with the beta zeolite being confined in a vessel or being tumbled while confined in a rotating kiln. The important factors are uniform treatment of all beta zeolite particles under appropriate conditions of time, temperature and steam concentration. For instance, the beta zeolite should not be placed such that there is a significant difference in the amount of steam contacting the surface and the interior of the beta zeolite mass. The beta zeolite may be steam treated in an atmosphere having live steam passing through the equipment providing low steam concentration. This may be described as being at a steam concentration of a positive amount less than 50 mol-%. Steam concentrations may range from 1 to 20 mol-% or from 5 to 10 mol-%, with small-scale laboratory operations extending toward higher concentrations. The steaming may be performed for a positive time period of less than or equal to 1 or 2 hours or for 1 to 2 hours at a temperature of less than or equal to about 600° C. (1112° F.) at atmospheric pressure and a positive content of steam of less than or equal to 5 mol-%. The steaming may be performed for a positive time period of less than or equal to 2 hours at a temperature of less than or equal to about 650° C. (1202° F.) at atmospheric pressure and a positive content of steam of less than or equal to 10 mol-%. The steam contents are based on the weight of vapors contacting the beta zeolite. Steaming at temperatures above 650° C. (1202° F.) appears to result in beta zeolite that is not useful in the process disclosed herein since the $SF_6$ adsorption capacity of the resulting beta zeolite is too low. Temperatures below 650° C. (1202° F.) can be used, and the steaming temperature can be from about 600° C. (1112° F.) to about 650° C. (1202° F.), or less than 600° C. (1112° F.). It is taught in the art that there is normally an interplay between time and temperature of steaming, with an increase in temperature reducing the required time. Nevertheless, if steaming is done, for good results it appears a time period of about ½ to about 2 hours or about 1 to about 1½ hours can be used. The method of performing steaming on a commercial scale may be by means of a rotary kiln having steam injected at a rate which maintains an atmosphere of about 10 mol-% steam.

An exemplary lab scale steaming procedure is performed with the zeolite held in a 6.4 cm (2½ inch) quartz tube in a clam shell furnace. The temperature of the furnace is slowly ramped up by a controller. After the temperature of the zeolite reaches 150° C. (302° F.) steam generated from deionized water held in a flask is allowed to enter the bottom of the quartz tube and pass upward. Other gas can be passed into the tube to achieve the desired steam content. The flask is refilled as needed. In the exemplary procedure the time between cutting in the steam and the zeolite reaching 600° C. (1112° F.) is about one hour. At the end of the set steam period the temperature in the furnace is reduced by resetting the controller to 20° C. (68° F.). The furnace is allowed to cool to 400° C. (752° F.) (about 2 hours) and the flow of steam into the quartz tube is stopped. The sample is removed at 100° C. (212° F.) and placed in a lab oven held overnight at 110° C. (230° F.) with an air purge.

The beta zeolite of the process and composition disclosed herein is not treated with an acid solution to effect dealumination. In this regard it is noted that essentially all raw (as synthesized) beta zeolite is exposed to an acid to reduce the concentration of alkali metal (e.g., sodium) which remains from synthesis. This step in the beta zeolite manufacture procedure is not considered part of the treatment of manufactured beta zeolite as described herein. In one embodiment, during the treatment and catalyst manufacturing procedures, the beta zeolite is exposed to an acid only during incidental manufacturing activities such as peptization during forming or during metals impregnation. In another embodiment, the beta zeolite is not acid washed after the steaming procedure as to remove aluminum "debris" from the pores.

Also included in the process and composition disclosed herein is a Y zeolite having a unit cell size from 24.38 to 24.50 angstrom. In one embodiment, the Y zeolite has an overall silica to alumina mole ratio from 5.0 to 11.0. The term "Y zeolite" as used herein is meant to encompass all crystalline zeolites having either the essential X-ray powder diffraction pattern set forth in U.S. Pat. No. 3,130,007 or a modified Y zeolite having an X-ray powder diffraction pattern similar to that of U.S. Pat. No. 3,130,007 but with the d-spacings shifted somewhat due, as those skilled in the art will realize, to cation exchanges, calcinations, etc., which are generally necessary to convert the Y zeolite into a catalytically active and stable form. The process and composition disclosed herein require a Y zeolite having either or both of the two properties mentioned above, such Y zeolites being modified Y zeolites in comparison to the Y zeolite taught in U.S. Pat. No. 3,130,007. As used herein, unit cell size means the unit cell size as determined by X-ray powder diffraction.

The Y zeolites used in the process and composition disclosed herein are large pore zeolites having an effective pore size greater than 7.0 angstrom. Since some of the pores of the Y zeolites are relatively large, the Y zeolites allow molecules relatively free access to their internal structure. The pores of the Y zeolites permit the passage thereinto of benzene molecules and larger molecules and the passage therefrom of reaction products.

One group of Y zeolites that may be used in the process and composition disclosed herein includes zeolites that are sometimes referred to as ultrastable Y zeolites. The composition and properties of this group of Y zeolites are, in essence, prepared by a four step procedure. First, a Y zeolite in the alkali metal form (usually sodium) and typically having a unit cell size of about 24.65 angstrom is cation exchanged with ammonium ions. The ammonium exchange step typically reduces the sodium content of the starting sodium Y zeolite from a value usually greater than about 8 wt-%, usually from about 10 to about 13 wt-%, calculated as $Na_2O$, to a value in the range from about 0.6 to about 5 wt-%, calculated as $Na_2O$. Methods of carrying out the ion exchange are well known in the art.

Second, the Y zeolite from the first step is calcined in the presence of water vapor. For example, the Y zeolite is calcined in the presence of at least 1.4 kpa(absolute) (hereinafter kPa (a)) (0.2 psi(absolute) (hereinafter psi(a))), at least 6.9 kpa(a) (1.0 psi(a)), or at least 69 kpa(a) (10 psi(a)) water vapor, in three embodiments. In two other embodiments, the Y zeolite is calcined in an atmosphere consisting essentially of or consisting of steam. The Y zeolite is calcined so as to produce a unit cell size in the range of 24.40 to 24.64 angstrom.

Third, the Y zeolite from the second step is ammonium exchanged once again. The second ammonium exchange further reduces the sodium content to less than about 0.5 wt-%, usually less than about 0.3 wt-%, calculated as $Na_2O$.

Fourth, the Y zeolite from the third step is treated further so as to yield Y zeolite having a unit cell size from 24.38 to 24.50 angstrom or preferably from 24.40 to 24.44 angstrom. In one embodiment, the Y zeolite resulting from the fourth step has an overall silica to alumina mole ratio from 5.0 to 11.0. The treatment of the fourth step can comprise any of the well known techniques for dealuminating zeolites in general and ultrastable Y zeolite in particular so as to yield the desired unit cell size and overall silica to alumina mole ratio. The fourth treatment step may change the unit cell size and/or the framework silica to alumina mole ratio, with or without changing the overall silica to alumina mole ratio. Generally, zeolite dealumination is accomplished by chemical methods such as treatments with acids, e.g., HCl, with volatile halides, e.g., $SiCl_4$, or with chelating agents such as ethylenediaminetetraacetic acid (EDTA). Another common technique is a hydrothermal treatment of the zeolite in either pure steam or in air/steam mixtures, preferably such as calcining in the presence of sufficient water vapor (for example, in an atmosphere consisting essentially of steam, and most preferably consisting of steam) so as to yield the desired unit cell size and overall silica to alumina mole ratio.

The above-discussed preparation procedure for Y zeolites used in the process and composition disclosed herein differs from the procedure for the Y zeolites taught in U.S. Pat. No. 3,929,672 by the addition of the fourth treatment step. U.S. Pat. No. 3,929,672, which is hereby incorporated herein by reference in its entirety, discloses a method for dealuminating an ultrastable Y zeolite. U.S. Pat. No. 3,929,672 teaches a preparation procedure wherein a sodium Y zeolite is partially exchanged with ammonium ions, followed by steam calcination under controlled temperature and steam partial pressure, followed by yet another ammonia exchange and then by an optional calcination step in a dry atmosphere. The exchange and steam calcination steps can be repeated to achieve the desired degree of dealumination and unit cell size reduction. The zeolites of U.S. Pat. No. 3,929,672 are known under the designation Y-84 or LZY-84 commercially available from UOP LLC, Des Plaines, Ill., U.S.A. Y-84 or LZY-84 zeolites may be produced by the first three steps just mentioned, but optionally one may include a further calcination step in a dry atmosphere, e.g., a calcination in water- and steam-free air, at 482° C. (900° F.) or higher.

The above-discussed preparation procedure for Y zeolites used in the process and composition disclosed herein also differs from the procedure for the Y zeolites taught in U.S. Pat. No. 5,350,501 by differences in the fourth treatment step. U.S. Pat. No. 5,350,501, which is hereby incorporated herein by reference in its entirety, discloses a fourth step that involves calcining the resulting zeolite from the third treatment step in the presence of sufficient water vapor (in an atmosphere consisting essentially of steam or consisting of steam) so as to yield a unit cell size below 24.40, and most preferably no more than 24.35 angstrom, and with a relatively low sorptive capacity for water vapor. The Y zeolite produced by the four-step procedure in U.S. Pat. No. 5,350,501 is a UHP-Y zeolite, an ultrahydrophobic Y zeolite as defined in U.S. Pat. No. 5,350,501. The most preferred UHP-Y zeolite in U.S. Pat. No. 5,350,501 is LZ-10 zeolite.

Another group of Y zeolites which may be used in the process and composition disclosed herein may be prepared by dealuminating a Y zeolite having an overall silica to alumina mole ratio below about 5 and are described in detail in U. S. Pat. Nos. 4,503,023, 4,597,956, and 4,735,928, which are hereby incorporated herein by reference in their entireties. U.S. Pat. No. 4,503,023 discloses another procedure for dealuminating a Y zeolite involving contacting the Y zeolite with an aqueous solution of a fluorosilicate salt using controlled proportions, temperatures, and pH conditions which avoid aluminum extraction without silicon substitution. U.S. Pat. No. 4,503,023 sets out that the fluorosilicate salt is used as the aluminum extractant and also as the source of extraneous silicon which is inserted into the Y zeolite structure in place of the extracted aluminum. The salts have the general formula:

wherein A is a metallic or nonmetallic cation other than $H^+$ having the valence "b." Cations represented by "A" are alkylammonium, $NH_4^+$, $Mg^{++}$, $Li^+$, $Na^+$, $K^+$, $Ba^{++}$, $Cd^{++}$, $Cu^{++}$, $H^+$, $Ca^{++}$, $Cs^+$, $Fe^{++}$, $Co^{++}$, $Pb^{++}$, $Mn^{++}$, $Rb^+$, $Ag^+$, $Sr^{++}$, $Ti^+$, and $Zn^{++}$.

A preferred member of this group is known as LZ-210, a zeolitic aluminosilicate molecular sieve available from UOP LLC, Des Plaines, Ill., U.S.A. LZ-210 zeolites and the other zeolites of this group are conveniently prepared from a Y zeolite starting material. In one embodiment, the LZ-210 zeolite has an overall silica to alumina mole ratio from 5.0 to 11.0. The unit cell size is 24.38 to 24.50 angstrom, preferably 24.40 to 24.44 angstrom. The LZ-210 class of zeolites used in the process and composition disclosed herein have a composition expressed in terms of mole ratios of oxides as in the following formula:

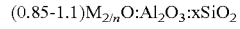

wherein "M" is a cation having the valence "n" and "x" has a value from 5.0 to 11.0.

In general, LZ-210 zeolites may be prepared by dealuminating Y-type zeolites using an aqueous solution of a fluorosilicate salt, preferably a solution of ammonium hexafluorosilicate. The dealumination can be accomplished by placing a Y zeolite, normally but not necessarily an ammonium exchanged Y zeolite, into an aqueous reaction medium such as an aqueous solution of ammonium acetate, and slowly adding an aqueous solution of ammonium fluorosilicate. After the reaction is allowed to proceed, a zeolite having an increased overall silica to alumina mole ratio is produced. The magnitude of the increase is dependent at least in part on the amount of fluorosilicate solution contacted with the zeolite and on the reaction time allowed. Normally, a reaction time of between about 10 and about 24 hours is sufficient for equilibrium to be achieved. The resulting solid product, which can be separated from the aqueous reaction medium by conventional filtration techniques, is a form of LZ-210 zeolite. In some cases this product may be subjected to a steam calcination by methods well known in the art. For instance, the product may be contacted with water vapor at a partial pressure of at least 1.4 kpa(a) (0.2 psi(a)) for a period of between about ¼ to about 3 hours at a temperature between 482° C. (900° F.) and about 816° C. (1500° F.) in order to provide greater crystalline stability. In some cases the product of the steam calcination may be subjected to an ammonium-exchange by methods well known in the art. For instance, the product may be slurried with water after which an ammonium salt is added to the slurry. The resulting mixture is typically heated for a period of hours, filtered, and washed with water. Methods of steaming and ammonium-exchanging LZ-210 zeolite are described in U.S. Pat. Nos. 4,503,023, 4,735,928, and 5,275,720.

The Y zeolites prepared by the above-discussed preparation procedures and used in the process and composition disclosed herein have the essential X-ray powder diffraction pattern of zeolite Y, and a unit cell size or dimension $a_o$ of 24.38 to 24.50 angstrom, preferably 24.40 to 24.44 angstrom. In one embodiment, these Y zeolites have an overall silica to alumina mole ratio of from 5.0 to 11.0. These Y zeolites may have a surface area (BET) of at least about 500 $m^2/g$, at most about 700 $m^2/g$, and typically from about 500 to about 650 $m^2/g$. As used herein, surface area means a 20-point surface area determined by standard test method UOP874-88, Pore Size Distribution of Porous Substances by Nitrogen Adsorption Using a Quantachrome Analyzer, which method is available from ASTM International, 100 Barr Harbor Drive, P.O. Box C700, West Conshohocken, Pa., U.S.A.

Another method of increasing the stability and/or acidity of the Y zeolites is by exchanging the Y zeolite with polyvalent metal cations, such as rare earth-containing cations, magnesium cations or calcium cations, or a combination of ammonium ions and polyvalent metal cations, thereby lowering the sodium content until it is as low as the values described above after the first or second ammonium exchange steps. Methods of carrying out the ion exchange are well known in the art.

The catalyst used in the process disclosed herein is intended primarily for use as a replacement catalyst in existing commercial hydrocracking units. Its size and shape is, therefore, preferably similar to those of conventional commercial catalysts. It is preferably manufactured in the form of a cylindrical extrudate having a diameter of from about 0.8 -3.2 mm (1/32-1/8 in). The catalyst can however be made in any other desired form such as a sphere or pellet. The extrudate may be in forms other than a cylinder such as the form of a well-known trilobal or other shape which has advantages in terms or reduced diffusional distance or pressure drop.

Commercial hydrocracking catalysts contain a number of non-zeolitic materials. This is for several reasons such as particle strength, cost, porosity, and performance. The other catalyst components, therefore, make positive contributions to the overall catalyst even if not as active cracking components. These other components are referred to herein as the support. Some traditional components of the support such as silica-alumina normally make some contribution to the cracking capability of the catalyst. In embodiments of the process and composition disclosed herein, the catalyst contains a positive amount of less than about 12, preferably less than about 10 wt-% beta zeolite based on the combined weight of the beta zeolite, the Y zeolite, and the support, all on a dried basis. As used herein the weight on a dried basis is considered to be the weight after heating in dry air at 500° C. (932° F.) for 6 hours. The catalyst contains at least about 20 wt-%, preferably at least about 30 wt-%, more preferably at least about 40 wt-%, and still more preferably from about 45 wt-% to about 60 wt-%, of Y zeolite, based on the combined weight of the beta zeolite, the Y zeolite, and the support, all on a dried basis. Based on the combined weight of the beta zeolite, the Y zeolite, and the support, all on a dried basis, the Y zeolite and beta zeolite content of the catalyst used in the process disclosed herein is at least about 40 wt-%, preferably at least about 50 wt-%, even more preferably from about 60 and 80 wt-%, with at least about 50 wt-%, preferably at least about 75 wt-%, even more preferably at least about 90 wt-%, and most preferably 100 wt-% of the balance being the support.

The remainder of the catalyst particle besides the zeolitic material may be taken up primarily by conventional hydrocracking materials such as alumina and/or silica-alumina. The presence of silica-alumina helps achieve the desired performance characteristics of the catalyst. In one embodiment the catalyst contains at least about 25 wt-% alumina and at least about 25 wt-% silica-alumina, both based on the combined weight of the zeolites and the support, all on a dried basis. In another embodiment, the silica-alumina content of the catalyst is above about 40 wt-% and the alumina content of the catalyst is above about 35 wt-%, both based on the combined weight of the zeolites and the support, all on a dried basis. However, the alumina is believed to function only as a binder and to not be an active cracking component. The catalyst support may contain over about 50 wt-% silica-alumina or over about 50 wt-% alumina based on the weight of the support on a dried basis. Approximately equal amounts of silica-alumina and alumina are used in an embodiment. Other inorganic refractory materials which may be used as a support in addition to silica-alumina and alumina include for example silica, zirconia, titania, boria, and zirconia-alumina. These aforementioned support materials may be used alone or in any combination.

Besides the beta zeolite, the Y zeolite, and other support materials, the subject catalyst contains a metallic hydrogenation component. The hydrogenation component is preferably provided as one or more base metals uniformly distributed in the catalyst particle. The hydrogenation component is one or more element components from Groups 6, 9, and 10 of the periodic table. Noble metals such as platinum and palladium could be applied but best results have been obtained with a combination of two base metals. Specifically, either nickel or cobalt is paired with tungsten or molybdenum, respectively. The preferred composition of the metal hydrogenation component is both nickel and molybdenum or both nickel and tungsten. The amount of nickel or cobalt is preferably between about 2 and about 8 wt-% of the finished catalyst. The amount of tungsten or molybdenum is preferably between about 8 and about 22 wt-% of the finished catalyst. The total amount of a base metal hydrogenation component is from about 10 to about 30 wt-% of the finished catalyst.

The catalyst of the subject process can be formulated using industry standard techniques. This can, with great generalization, be summarized as admixing the beta zeolite and the Y zeolite with the other inorganic oxide components and a liquid such as water or a mild acid to form an extrudable dough followed by extrusion through a multihole die plate. The extrudate is collected and preferably calcined at high temperature to harden the extrudate. The extruded particles are then screened for size and the hydrogenation components are added as by dip impregnation or the well known incipient wetness technique. If the catalyst contains two metals in the hydrogenation component these may be added sequentially or simultaneously. The catalyst particles may be calcined between metal addition steps and again after the metals are added.

In another embodiment, it may be convenient or preferred to combine the porous inorganic refractory oxide, the beta zeolite the Y zeolite, and compound(s) containing the metal(s), then to comull the combined materials, subsequently to extrude the comulled material, and finally to calcine the extruded material. In a preferred embodiment, the comulling is effected with ammonium heptamolybdate as the source of molybdenum and nickel nitrate as the source of nickel, with both compounds generally being introduced into the combined materials in the form of an aqueous solution. Other metals can be similarly introduced in dissolved aqueous form or as a salt. Likewise, non-metallic elements, e.g., phosphorus, may be introduced by incorporating a soluble component such as phosphoric acids into the aqueous solution when used.

Yet other methods of preparation are described in U.S. Pat. Nos. 5,279,726 and 5,350,501, which are hereby incorporated herein by reference in their entireties.

Catalysts prepared by the above-discussed procedures contain the hydrogenation metals in the oxide form. The oxide form is generally converted to the sulfide form for hydrocracking. This can be accomplished by any of the well known techniques for sulfiding, including ex situ presulfiding prior to loading the catalyst in the hydrocracking reactor, presulfiding after loading the catalyst in the hydrocracking reactor and prior to use at an elevated temperature, and in situ sulfiding, i.e., by using the catalyst in the oxide form to hydrocrack a hydrocarbon feedstock containing sulfur compounds under hydrocracking conditions, including elevated temperature and pressure and the presence of hydrogen.

The hydrocracking process disclosed herein will be operated within the general range of conditions now employed commercially in hydrocracking processes. The operating conditions in many instances are refinery or processing unit specific. That is, they are dictated in large part by the construction and limitations of the existing hydrocracking unit, which normally cannot be changed without significant expense, the composition of the feed and the desired products. The inlet temperature of the catalyst bed should be from about 232° C. (450° F.) to about 454° C. (850° F.), and the inlet pressure should be from about 5171 kpa(g) (750 psi(g)) to about 24132 kpa(g) (3500 psi(g)), and typically from about 6895 kpa(g) (1000 psi(g)) to about 24132 kpa(g) (3500 psi (g)). The feed stream is admixed with sufficient hydrogen to provide a volumetric hydrogen circulation rate per unit volume of feed of about 168 to 1684 normal ltr/ltr measured at 0C. (32° F.) and 101.3 kpa(a) (14.7 psi(a)) (1000 to 10000 standard ft$^3$/barrel (SCFB) measured at 15.6° C. (60° F.) and 101.3 kpa(a) (14.7 psi(a))) and passed into one or more reactors containing fixed beds of the catalyst. The hydrogen will be primarily derived from a recycle gas stream which may pass through purification facilities for the removal of acid gases although this is not necessary. The hydrogen rich gas admixed with the feed and in one embodiment any recycle hydrocarbons will contain at least 90 mol percent hydrogen. For hydrocracking to produce naphtha the feed rate in terms of LHSV will normally be within the broad range of about 0.3 to 3.0 hr$^{-1}$. As used herein, LHSV means liquid hourly space velocity, which is defined as the volumetric flow rate of liquid per hour divided by the catalyst volume, where the liquid volume and the catalyst volume are in the same volumetric units.

The typical feed to the process disclosed herein is a mixture of many different hydrocarbons and coboiling compounds recovered by fractional distillation from a crude petroleum. It will normally have components that boil higher than the upper end of the range of the $C_6$ to 216° C. (420° F.) boiling range. Often it will have a boiling point range starting above about 340° C. (644° F.) and ending in one embodiment below about 482° C. (900° F.), in another embodiment below about 540° C. (1004° F.), and in a third embodiment below about 565° C. (1049° F.). Such a petroleum derived feed may be a blend of streams produced in a refinery such as atmospheric gas oil, coker gas oil, straight run gas oil, deasphalted gas oil, vacuum gas oil, and FCC cycle oil. A typical gas oil comprises components that boil in the range of from about 166° C. (330° F.) to about 566° C. (1050° F.). Alternatively, the feed to the process disclosed herein can be a single fraction such as a heavy vacuum gas oil. A typical heavy gas oil fraction has a substantial proportion of the hydrocarbon components, usually at least about 80 percent by weight, boiling from about 371° C. (700° F.) to about 566° C. (1050° F.). Synthetic hydrocarbon mixtures such as recovered from shale oil or coal can also be processed in the subject process. The feed may be subjected to hydrotreating or treated as by solvent extraction prior to being passed into the subject process to remove gross amounts of sulfur, nitrogen or other contaminants such as asphaltenes.

The subject process is expected to convert a large portion of the feed to more volatile hydrocarbons such as naphtha boiling range hydrocarbons. Typical conversion rates vary from about 50 to about 100 volume-percent (hereinafter vol-%) depending greatly on the feed composition. The conversion rate is between from about 60 to about 90 vol-% in an embodiment of the process disclosed herein, from about 70 to about 90 vol-% in another embodiment, from about 80 and to about 90 vol-% in yet another embodiment, and from about 65 to about 75 vol-% in still another embodiment. The effluent of the process will actually contain a broad variety of hydrocarbons ranging from methane to essentially unchanged feed hydrocarbons boiling above the boiling range of any desired product. The effluent of the process typically passes from a reactor containing a catalyst and is usually separated by methods known to a person of ordinary skill in the art, including phase separation or distillation, to produce a product having any desired final boiling point. The hydrocarbons boiling above the final boiling point of any desired product are referred to as unconverted products even if their boiling point has been reduced to some extent in the process. Most unconverted hydrocarbons are recycled to the reaction zone with a small percentage, e.g. 5 wt-% being removed as a drag stream. In one embodiment at least 30 wt-%, and preferably at least 50 wt-%, of the effluent boils below 216° C. (420° F.).

The process and composition disclosed herein can be employed in what are referred to in the art as single stage and two stage process flows, with or without prior hydrotreating. These terms are used as defined and illustrated in the book titled Hydrocracking Science and Technology, by J. Scherzer and A. J. Gruia, ISBN 0-8247-9760-4, Marcel Dekker Inc., New York, 1996. In a two-stage process the subject catalyst can be employed in either the first or second stage. The catalyst may be preceded by a hydrotreating catalyst in a separate reactor or may be loaded into the same reactor as a hydrotreating catalyst or a different hydrocracking catalyst. An upstream hydrotreating catalyst can be employed as feed pretreatment step or to hydrotreat recycled unconverted materials. The hydrotreating catalyst can be employed for the specific purpose of hydrotreating polynuclear aromatic (PNA) compounds to promote their conversion in subsequent hydrocracking catalyst bed(s). The subject catalyst can also be employed in combination with a second, different catalyst, such as a catalyst based upon Y zeolite or having primarily amorphous cracking components.

In some embodiments of the process disclosed herein, the catalyst is employed with a feed or in a configuration that the feed passing through the catalyst is a raw feed or resembles a raw feed. The sulfur content of crude oil, and hence the feed to this process, varies greatly depending on its source. As used herein, a raw feed is intended to refer to a feed which has not been hydrotreated or which still contains organic sulfur compounds which result in a sulfur level above 1000 wt-ppm or which still contains organic nitrogen compounds that result in a nitrogen level above 100 wt-ppm (0.01 wt-%).

In other embodiments of the process disclosed herein, the catalyst is used with a feed that has been hydrotreated. Persons of ordinary skill in the art of hydrocarbon processing know and can practice hydrotreating of a raw feed to produce a hydrotreated feed to be charged to the process disclosed herein. Although the sulfur level of the feed may be between 500 and 1000 wt-ppm, the sulfur level of the hydrotreated feed is less than 500 wt-ppm in one embodiment of the process disclosed herein and from 5 to 500 wt-ppm in another embodiment. The nitrogen level of the hydrotreated feed is less than 100 wt-ppm in one embodiment and from 1 to 100 wt-ppm in another embodiment.

All references herein to the groups of elements of the periodic table are to the IUPAC "New Notation" on the Periodic Table of the Elements in the inside front cover of the book titled CRC Handbook of Chemistry and Physics, ISBN 0-8493-0480-6, CRC Press, Boca Raton, Fla., U.S.A., 80$^{th}$ Edition, 1999-2000. All references herein to boiling points are to boiling points as determined by ASTM D2887, Standard Test Method for Boiling Range Distribution of Petroleum Fractions by Gas Chromatography, which method is available from ASTM International.

The following examples are provided for illustrative purposes and not to limit the process and composition as defined in the claims.

EXAMPLE I

Catalyst 1

A sample of commercially-available steamed and ammonium-exchanged LZ-210 was obtained from UOP LLC. The LZ-210 had an overall silica to alumina ($SiO_2$ to $Al_2O_3$) mole ratio of from 8.0 to 10.0 and a unit cell size of 24.42 angstrom. Catalyst 1 was prepared by comulling a mixture of the LZ-210, beta zeolite having an overall silica to alumina ($SiO_2$ to $Al_2O_3$) mole ratio of 23.8 and an $SF_6$ adsorption capacity of 29 wt-%, $HNO_3$-peptized Catapal™ C boehmite alumina (Catapal C alumina is available from Sasol North America, Inc., Houston, Tx., U.S.A.), sufficient nickel nitrate to provide 5 wt-% nickel (calculated as NiO) in the final catalyst and sufficient ammonium heptamolybdate to provide 15 wt-% molybdenum (calculated as $MoO_3$) in the final catalyst. The comulled mixture was extruded into 1.6 mm (1/16 in) diameter cylindrical particles of between 3.2 mm (1/8 in) and 12.7 mm (1/2 in) in length, dried, and then calcined at about 500° C. (932° F.) for a minimum of 90 minutes. The resulting catalyst contained nickel and molybdenum in the proportions above specified. The catalyst contained 45 wt-% LZ-210 zeolite, 5 wt-% beta zeolite, and 50 wt-% alumina based on the combined weight of the zeolites and the support all on a dried basis.

Catalyst 2

Catalyst 2 was prepared similarly to Catalyst 1 except more of the LZ-210 and more of the beta zeolite was used. The resulting catalyst contained nickel and molybdenum in the proportions above specified for Catalyst 1. The catalyst contained 60 wt-% LZ-210 zeolite, 10 wt-% beta zeolite, and 40 wt-% alumina based on the combined weight of the zeolites and the support all on a dried basis.

Catalyst 3 (comparative)

Catalyst 3 was prepared similarly to Catalyst 1 except the LZ-210 was used in place of the beta zeolite. The resulting catalyst contained the nickel and molybdenum in the proportions above specified for Catalyst 1. The catalyst contained 50 wt-% LZ-210 zeolite and 50 wt-% alumina based on the combined weight of the zeolites and the support all on a dried basis.

Catalyst 4 (comparative)

Catalyst 4 was prepared similarly to Catalyst 2 except the LZ-210 was used in place of the beta zeolite. The resulting catalyst contained nickel and molybdenum in the proportions above specified for Catalyst 2. The catalyst contained 70 wt-% LZ-210 zeolite and 30 wt-% alumina based on the combined weight of the zeolites and the support all on a dried basis.

Catalyst 5 (comparative)

Catalyst 5 was prepared similarly to Catalyst 1 except more of the LZ-210 and more of the beta zeolite was used. The resulting catalyst contained nickel and molybdenum in the proportions above specified for Catalyst 1. The catalyst contained 50 wt-% LZ-210 zeolite, 12.5 wt-% beta zeolite, and 37.5 wt-% alumina based on the combined weight of the zeolites and the support all on a dried basis.

EXAMPLE II

Each of the above-described five catalysts was pre-sulfided by passing a gas stream consisting of 10 vol-% $H_2S$ and the balance $H_2$ through a bed of the catalyst at a temperature initially of about 149° C. (300° F.) and slowly raised to 413° C. (775° F.) and held at the temperature for about 6 hours.

The five catalysts were compared for hydrocracking activity and selectivity (i.e., product yields) in simulated first stage testing. Specifically, the five catalysts were separately tested for hydrocracking a hydrotreated coker gas oil feed having a specific gravity of 0.8647 at 15.6° C. (60° F.) (API gravity of 32.15°), an initial boiling point of 94° C. (202° F.), a 5 wt-% boiling point of 170° C. (338° F.), a final boiling point of 440° C. (824° F.), and a 50 wt-% boiling point of 297° C. (566° F.), with about 15 wt-% boiling below 216° C. (420° F.).

Each catalyst was tested for simulated first stage operation by passing the feedstock through a laboratory size reactor at a LHSV of 1.5 hr$^{-1}$, a total pressure of 9997 kpa(g) (1450 psi(g)), and a volumetric hydrogen feed rate per unit volume of feed of 1684 normal ltr/ltr measured at 0° C. (32° F.) and 101.3 kPa(a) (14.7 psi(a)) (10000 SCFB measured at 15.6° C. (60° F.) and 101.3 kpa(a) (14.7 psi(a))). Sufficient di-tertbutyl disulfide was added to the feed to provide 1.70 wt-% sulfur and thereby to simulate a hydrogen sulfide-containing atmosphere as it exists in commercial first stage hydrocracking reactors. In addition, sufficient cyclohexylamine was added to the feed to provide 2640 wt-ppm nitrogen and thereby to simulate an ammonia-containing atmosphere as it exists in commercial first stage hydrocracking reactors. The temperature conditions were adjusted as necessary to maintain about a 65 wt-% net conversion to materials boiling below 216° C. (420° F.), over the course of 100 hours. Net conversion is the effluent boiling below 216° C. (420° F.) as a percentage of the feed minus the percentage of the feed boiling below 216° C. (420° F.). At the end of the 100 hours, the temperature required to maintain the 65 wt-% net conversion was recorded, and the activity and selectivity of each catalyst relative to a commercial reference were calculated. These data are summarized in the Table. The activity and yield data for each catalyst are entered as the difference between the actual value for activity or yield of the catalyst minus the actual value for activity or yield obtained with the reference. The more negative the value for activity, the more active is the catalyst.

TABLE

| Composition, wt-% of zeolite and support on a dried basis | Catalyst designation | | | | |
|---|---|---|---|---|---|
| | 1 | 2 | 3 | 4 | 5 |
| Zeolites | 50 | 70 | 50 | 70 | 62.5 |
| Y zeolite | 45 | 60 | 50 | 70 | 50 |
| Beta zeolite | 5 | 10 | — | — | 12.5 |
| Support | 50 | 30 | 50 | 30 | 37.5 |
| Y:Beta ratio, weight/weight | 9 | 6 | NA | NA | 4 |
| Relative activity, ° C. (° F.) | −4 (−8) | −7 (−12) | −2 (−3) | −3 (−6) | −6 (−11) |
| Relative $C_6$-216° C. ($C_6$-420° F.) fraction yield, wt-% | +0.7 | +0.6 | +0.8 | +0.7 | −0.1 |

NA = Not Applicable

As shown in the Table, the catalytic activity of Catalyst 1, a catalyst disclosed herein containing a combination of beta zeolite and Y zeolite having a unit cell size of 24.45 angstrom, is substantially greater than that of the reference in both activity and yield. Catalyst 1 is 4.4° C. (8° F.) more active than the reference, and also shows a significant advantage over the reference with respect to yield of the $C_6$ to 216° C. (420° F.) boiling fraction. The catalytic activity of Catalyst 1 is also greater than that of Catalyst 3, which is a catalyst that has the same total amount of zeolite as Catalyst 1 but has no beta zeolite, at nearly the same yield of the $C_6$ to 216° C. (420° F.) boiling fraction.

The Table also shows that the catalytic activity of Catalyst 2, another catalyst disclosed herein containing a combination of beta zeolite and Y zeolite having a unit cell size of 24.45 angstrom, is substantially greater than that of the reference in both activity and yield. Catalyst 2 is 6.7° C. (12° F.) more active than the reference, and also shows a significant advantage over the reference with respect to yield of the $C_6$ to 216° C. (420° F.) boiling fraction. The catalytic activity of Catalyst 2 is also greater than that of Catalyst 4, which is a catalyst that has the same total amount of zeolite as Catalyst 2 but has no beta zeolite, at nearly the same yield of the $C_6$ to 216° C. (420° F.) boiling fraction.

Catalyst 5 shows that an excess of beta zeolite, when used in combination with a Y zeolite having a unit cell size of 24.45 angstrom, gives nearly the same yield of the $C_6$ to 216° C. (420° F.) boiling fraction as the reference.

What is claimed is:

1. A process for hydrocracking a hydrocarbon feedstock which comprises contacting the feedstock at a temperature from about 232° C. to about 454° C. and at a pressure from about 5171 kPa(g) to about 24132 kPa(g) in the presence of hydrogen with a catalyst comprising a hydrogenation component, a beta zeolite, and a Y zeolite having a unit cell size from 24.38 to 24.50 angstrom, the catalyst having a weight ratio of Y zeolite to beta zeolite of from 5 to 12 on a dried basis.

2. The process of claim 1 wherein the weight ratio of the Y zeolite to the beta zeolite is from 6 to 9 on a dried basis.

3. The process of claim 1 wherein the unit cell size is from 24.40 to 24.44 angstrom.

4. The process of claim 1 wherein the catalyst comprises a support and contains at least about 20 wt-% Y zeolite based on the combined weight of the beta zeolite, the Y zeolite, and the support all on a dried basis.

5. The process of claim 1 wherein the catalyst comprises a support and contains a positive amount of less than about 12 wt-% beta zeolite based on the combined weight of the beta zeolite, the Y zeolite, and the support all on a dried basis.

6. The process of claim 1 wherein the catalyst comprises a support and contains at least about 40 wt-% of beta zeolite and Y zeolite based on the combined weight of the beta zeolite, the Y zeolite, and the support all on a dried basis.

7. The process of claim 1 wherein the Y zeolite has an overall silica to alumina mole ratio from 5.0 to 11.0.

8. The process of claim 1 wherein the Y zeolite is prepared by a process comprising the steps of:
 a) partially ammonium exchanging a sodium Y zeolite;
 b) calcining the zeolite resulting from step (a) in the presence of water vapor;
 c) contacting the zeolite resulting from step (b) with a fluorosilicate salt in the form of an aqueous solution; and
 d) calcining the zeolite resulting from step (c) in the presence of water vapor.

9. The process of claim 8 wherein the zeolite resulting from step (d) has a BET surface area of from about 500 to about 700 m$^2$/g.

10. The process of claim 1 wherein the Y zeolite is an LZ-210 zeolite.

11. The process of claim 1 wherein the Y zeolite is prepared by a process comprising the steps of:
 a) partially ammonium exchanging a sodium Y zeolite;
 b) calcining the zeolite resulting from step (a) in the presence of water vapor;
 c) ammonium exchanging the zeolite resulting from step (b); and
 d) calcining the zeolite resulting from step (c) in the presence of water vapor.

12. The process of claim 1 wherein the beta zeolite has an overall silica to alumina mole ratio of less than 30.0.

13. The process of claim 1 wherein the beta zeolite has a $SF_6$ adsorption capacity of at least 25 wt-%.

14. The process of claim 1 wherein the hydrogenation component is selected from the group consisting of an IUPAC Group 6 component, an IUPAC Group 9 component, and a IUPAC Group 10 component.

15. The process of claim 14 wherein the hydrogenation component is selected from the group consisting of molybdenum, tungsten, nickel, cobalt, and the oxides and sulfides thereof.

16. A hydrocracking process comprising contacting a hydrocarbon feedstock with a catalyst at a temperature between about 232° C. and about 454° C. and at a pressure between about 5171 kPa(g) and about 24132 kPa(g) in the presence of hydrogen so as to produce an effluent of lower average boiling point than the hydrocarbon feedstock, the catalyst comprising one or more hydrogenation components in combination with a support comprising an inorganic refractory oxide, zeolite beta in a form catalytically active for cracking hydrocarbons, and a Y zeolite catalytically active for cracking hydrocarbons, the Y zeolite having a unit cell size of from 24.38 to 24.50 angstrom, the catalyst having a weight ratio of zeolite beta to Y zeolite of from 5 to 12.

17. The hydrocracking process of claim 16 wherein the Y zeolite has an overall silica to alumina mole ratio of from 5.0 to 11.0.

18. The hydrocracking process of claim 16 wherein at least 30 wt-% of the effluent boils below 216° C.

19. The hydrocracking process of claim 16 wherein at least 50 wt-% of the effluent boils below 216° C.

* * * * *